United States Patent [19]

Kobayashi et al.

[11] Patent Number: 4,913,275
[45] Date of Patent: Apr. 3, 1990

[54] CLUTCH DISK APPARATUS

[75] Inventors: Tadamasa Kobayashi, Okazaki; Ryoichi Kudo, Toyota, both of Japan

[73] Assignee: Aisin Seiki Kabushiki Kaisha, Kariya, Japan

[21] Appl. No.: 277,704

[22] Filed: Nov. 30, 1988

[30] Foreign Application Priority Data

Nov. 30, 1987 [JP] Japan .................. 62-300097

[51] Int. Cl.⁴ .......................... F16D 3/14; F16D 47/02
[52] U.S. Cl. .................................. 192/106.1
[58] Field of Search .......................... 192/106.1, 106.2; 464/87, 89, 90

[56] References Cited

U.S. PATENT DOCUMENTS

| | | | |
|---|---|---|---|
| 1,954,190 | 4/1934 | Zeder | 192/106.1 |
| 2,397,642 | 4/1946 | Blazek et al. | 192/106.1 |
| 2,533,789 | 12/1950 | Goodchild | 192/106.1 |
| 4,474,276 | 10/1984 | Loizeau | 192/106.1 |

FOREIGN PATENT DOCUMENTS

| | | |
|---|---|---|
| 1265509 | 4/1968 | Fed. Rep. of Germany ... 192/106.1 |
| 1273995 | 7/1968 | Fed. Rep. of Germany ... 192/106.1 |
| 2111350 | 9/1972 | Fed. Rep. of Germany ... 192/106.1 |

Primary Examiner—Rodney H. Bonck
Assistant Examiner—Nicholas Whitelaw
Attorney, Agent, or Firm—Burns, Doane, Swecker & Mathis

[57] ABSTRACT

An automotive vehicle clutch disc apparatus has a clutch hub provided with arm portions and an outer two-piece housing including, a clutch hub connected to a manual transmission, a stopper connected integrally with the clutch hub, a resilient element wrapping outward of the clutch hub, the stopper having a plurality of lugs, the housing having plurality of openings, the lugs are operatively connected to the opening and the clutch hub equipped with the resilient element applied to an initial deformation during assembly.

5 Claims, 4 Drawing Sheets

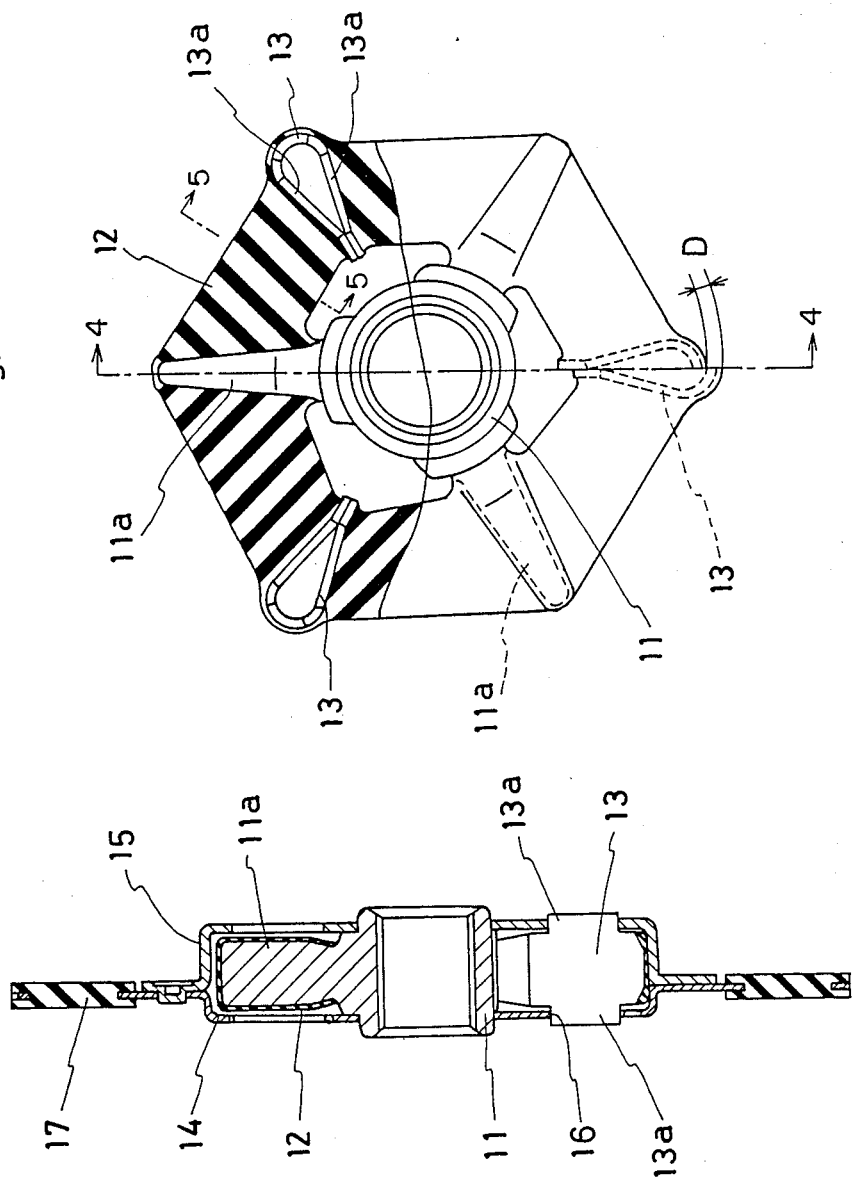

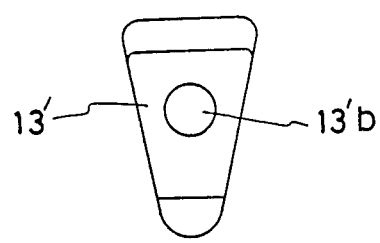
Fig. 7
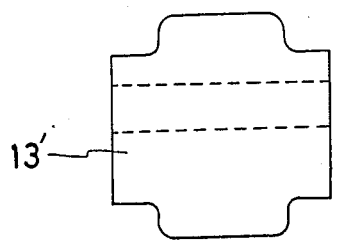
Fig. 8
Fig. 9
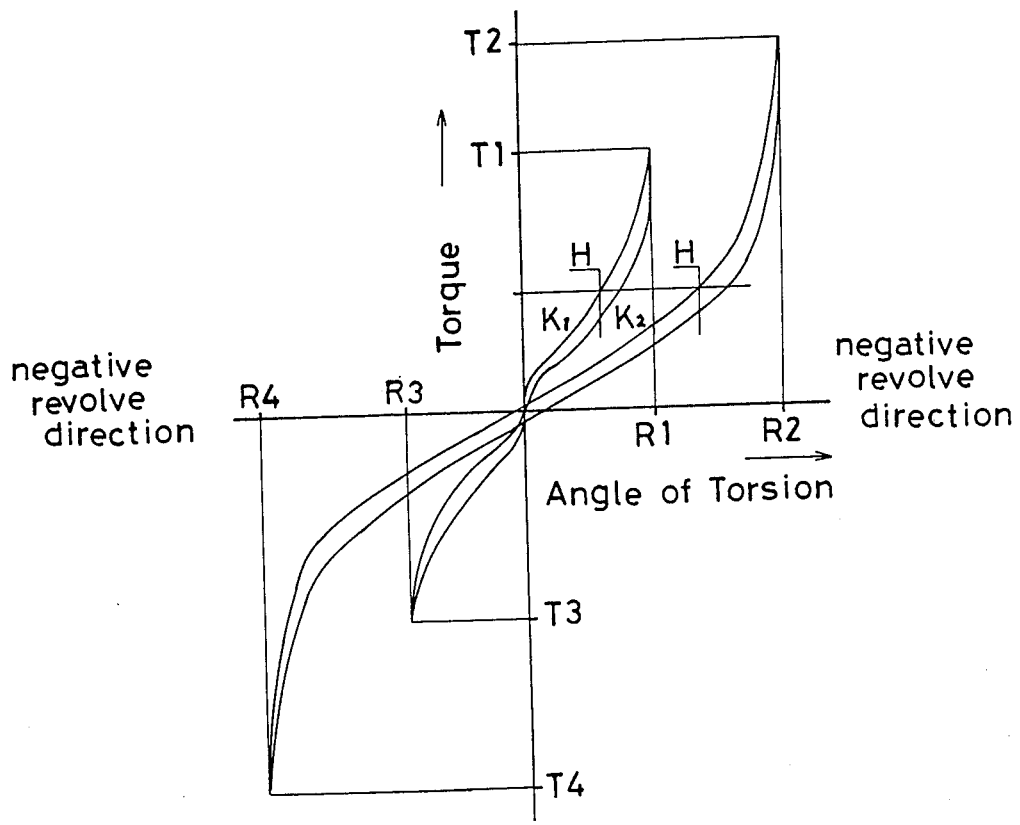

CLUTCH DISK APPARATUS

BACKGROUND OF THE INVENTION

1. Field of the Invention

This invention relates to a clutch disk apparatus for an automotive vehicle which has a resilient connection between the drive and driven portion of the clutch for resiliently transmitting torque. In a clutch of this kind, the resilient connection absorbs driveline shocks and jerky operation which may be due to incorrect operation of the clutch plate.

2. Description of the Related Art

In a conventional type clutch disk in the power train of automotive vehicles which are powered by internal combustion engines, torsional vibration clutches generally include elastic members disposed at some points between the engine and the gear mechanism. For this purpose, the hub portion of the clutch and the clutch disk of prior art devices are separated from one another and are connected together by way of tangentially acting helical springs which permit an elastic transmission of the torsional moments. This elastic transmission of the torsional moments, in addition to permitting the automotive vehicle to be set in motion more smoothly, serves to dampen the vibrations which are normally superimposed on the rotary movement of the clutch disc.

SUMMARY OF THE INVENTION

The object of this invention is to provide a clutch disc apparatus for an automotive vehicle in which the abovementioned drawback of the conventional apparatus is eliminated.

Another object of this invention is to extend the rotational range of the clutch disc apparatus.

The further object of this invention is to absorb a vibration which is generated by the operation of an automotive vehicle and to decrease the constitute elements of the conventional clutch disc.

The foregoing and other objects, features and advantages of the present invention will be understood more clearly and fully from the following detailed description of preferred embodiments with reference to the attached drawings.

BRIEF DESCRIPTION OF THE DRAWINGS

FIG. 2 shows a cross-sectional view taken along the plane by the line 2—2 in FIG. 1;

FIG. 3 shows a partial axial cross-sectional view of a clutch hub of a preferred embodiment of the present invention;

FIG. 7 shows a front elevation of the stopper in connection with another embodiment of the present invention;

FIG. 8 shows a side view of the stopper in connection with another embodiment of the present invention; and FIG. 9 shows a hysteresis characteristic between the angle of torsion and the input torque.

DETAILED DESCRIPTION OF THE PREFERRED EMBODIMENTS

Figure 1:
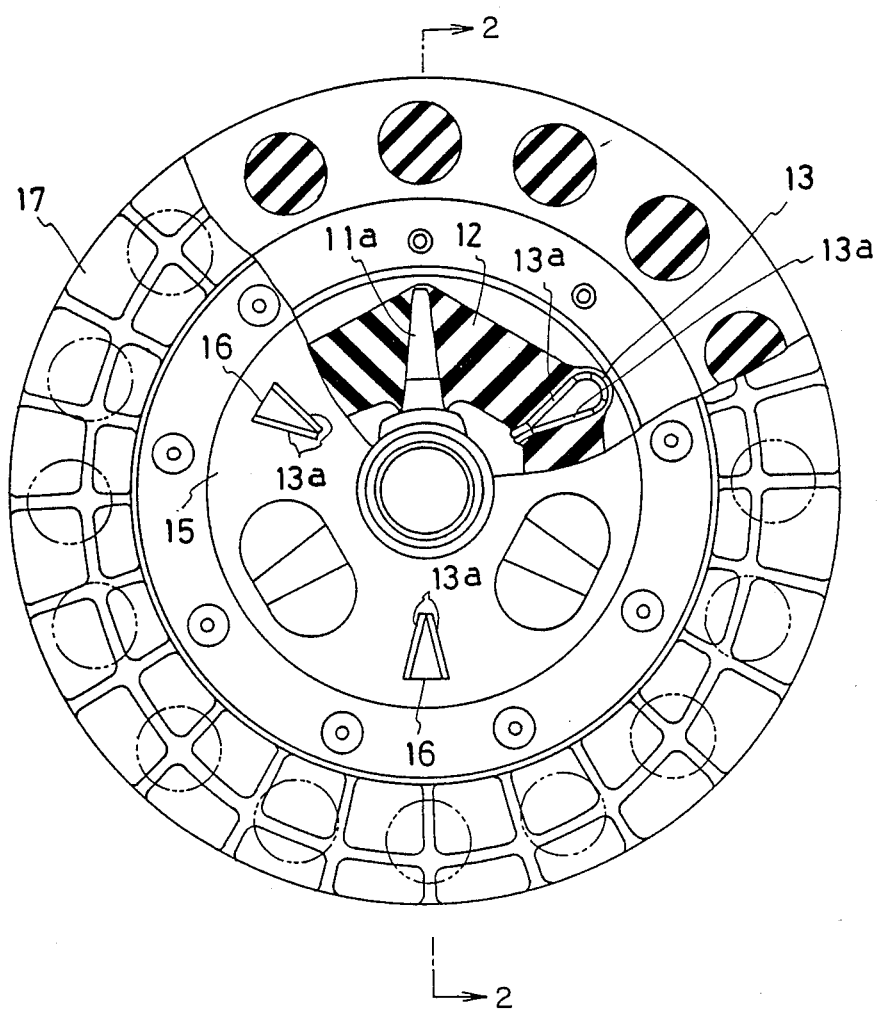
FIG. 1 shows a partial axial cross-sectional view of a preferred embodiment of the present invention.

FIG. 1 through FIG. 5 show an embodiment of the present invention. Referring now to FIGS. 1 and 2, a clutch disk apparatus includes a clutch hub 11, a resilient element 12, housing 14, 15 and clutch linings 17. A plurality, e.g., three, radial arms 11a extend outwardly from hub 11 to a point just short of housing 15. A stopper 13 is connected to the clutch hub 11a. The stopper 13 has a plurality, e.g., four, lugs 13a. The stopper 13 is shaped substantially like a ring. At the edge of the stopper 13, which is made from iron or similar material, each section is connected to each other section by welding. The resilient element 12 is provided outwardly of the clutch hub as an integral body. The resilient element 12 wraps around and encloses the arms 11a and the stoppers 13. The housing 15 has a plurality of opening 16, and the lugs 13a are operatively connected to the opening 16.

Figure 4:
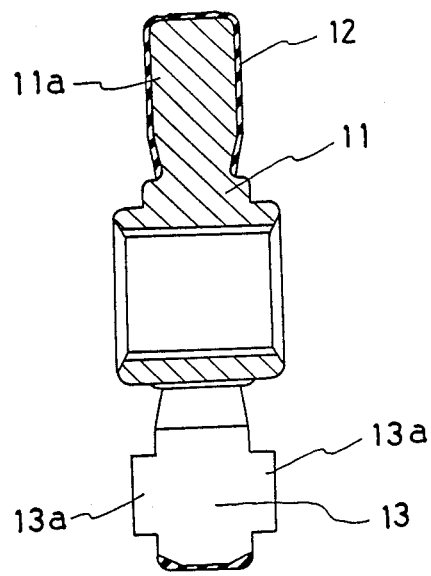
FIG. 4 shows a cross-sectional view taken along the plane by the line 4—4 in FIG. 3.
Figure 5:
FIG. 5 shows a cross-sectional view taken along the plane by the line 5—5 of FIG. 3.

As seen from FIG. 3, the resilient element 12 is shaped substantially in the form of a hexagon. When torque is transmitted to the resilient element 12 via clutch linings 17, the resilient element will flex. When the resilient element 12 is assembled into the housing 15 and 14, the resilient element 12 is given an initial flexing D (shown in FIG. 3). FIG. 4 shows a cross-sectional view taken along the plane defined by the line 4—4 of FIG. 3. FIG. 5 shows a cross-sectional view taken along the plane defined by the line 5—5 of FIG. 4. The cross section of the resilient element 12 shows the element to be of substantially rectangular form. Of course, other cross-sectional shaped resilient elements could be provided for this clutch disc apparatus.

Figure 6:
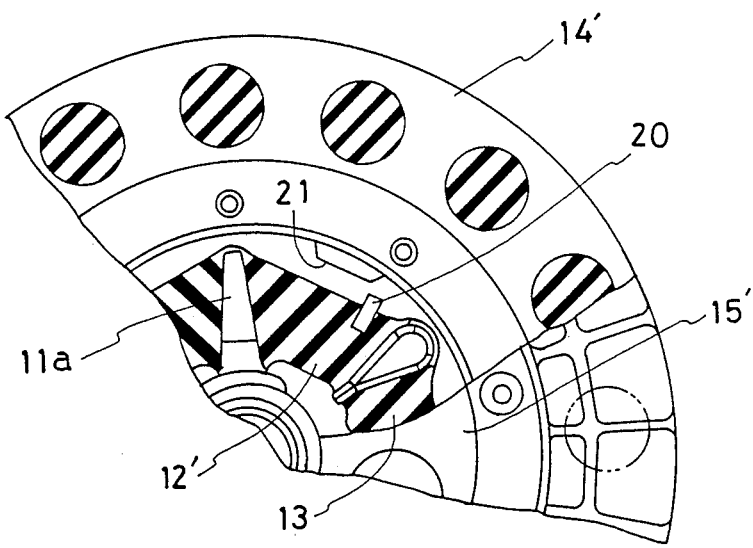
FIG. 6 shows a partial axial cross sectional view of another embodiment of the present invention.

FIG. 6 shows another embodiment of this invention. A projection 20 is unitarily connected to the resilient element. A cam element 21 is connected to the housing 15. When torque is transmitted to the clutch disk, the resilient element 12 deforms in accordance with the input torque. During such operation, the projection slides along the surface of the cam element 21 and the hysteresis characteristics shown in FIG. 9 at line K2 is produced.

FIG. 7 shows another embodiment of the stopper 13 of the invention. The stopper has a projection 13'. The projection 13', has a hole or opening 13b' which permits ease of assembly for the clutch disk. The projection 13' is connected to the opening 16 of the housing 15, 14 and opposes excess rotation applied to the resilient element 12.

FIG. 9 shows a hysteresis characteristics of the invention. A line K1 illustrates a hysteresis characteristics in an embodiment of this invention shown in FIG. 1. A line K2 illustrates a hysteresis characteristics embodiment of this invention shown in FIG. 6.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature an not limited to the scope and spirit of the invention as set forth in the appended claims.

What is claimed is:

1. In an automotive vehicle clutch disc apparatus having a clutch hub provided with arm portions and a two piece outer housing comprising:
   (a) a clutch hub connected to a manual transmission;
   (b) a stopper connected integrally with said clutch hub;
   (c) a resilient element extending outwardly and circumferentially enclosing said clutch hub and including a projection connected to said resilient element so as to constitute a unitary body and a cam element connected to said housing for contacting said projection;
   (d) said stopper having a plurality of lugs;
   (e) said housing having a plurality of openings;
   (f) said lugs operatively connected to said openings; and
   (g) said clutch hub equipped with said resilient element provided with an initial deformation when assembled into said housing.

2. A clutch disc apparatus for an automotive vehicle according to claim 1 wherein;
   said stopper has a plurality of lugs each of which is directed to a surface of said housing.

3. A clutch disc apparatus for an automotive vehicle according to claim 1 wherein;
   a cross section of said resilient element is of substantially rectangular form.

4. A clutch disc apparatus for an automotive vehicle according to claim 1 wherein;
   said stopper has a projection and an opening extending in an axial direction of said hub.

5. A clutch disc apparatus for an automotive vehicle according to claim 1 wherein;
   said clutch hub and said stopper are covered with a common resilient element.

* * * * *